US008849516B2

(12) United States Patent
Lazic et al.

(10) Patent No.: US 8,849,516 B2
(45) Date of Patent: Sep. 30, 2014

(54) METHOD AND SYSTEM FOR ADAPTATION OF A STEERING WHEEL TORQUE OVERLAY OF A LANE KEEPING AID SYSTEM

(71) Applicant: Volvo Car Corporation, Goeteborg (SE)

(72) Inventors: Nenad Lazic, Goeteborg (SE); Claes Olsson, Moelnlycke (SE)

(73) Assignee: Volvo Car Corporation (SE)

( * ) Notice: Subject to any disclaimer, the term of this patent is extended or adjusted under 35 U.S.C. 154(b) by 58 days.

(21) Appl. No.: 13/671,946

(22) Filed: Nov. 8, 2012

(65) Prior Publication Data

US 2013/0124047 A1 May 16, 2013

(30) Foreign Application Priority Data

Nov. 11, 2011 (EP) ..................................... 11188765

(51) Int. Cl.
*B62D 6/00* (2006.01)
*B62D 15/02* (2006.01)
(52) U.S. Cl.
CPC .................................... *B62D 15/025* (2013.01)
USPC ............................................. 701/42; 701/41
(58) Field of Classification Search
USPC ......................................................... 701/42, 41
See application file for complete search history.

(56) References Cited

U.S. PATENT DOCUMENTS

| 6,134,491 | A | 10/2000 | Kawagoe et al. |
| 6,212,453 | B1 | 4/2001 | Kawagoe et al. |
| 7,177,745 | B2 * | 2/2007 | Tsuchiya ......................... 701/41 |
| 7,711,464 | B2 * | 5/2010 | Kaufmann ....................... 701/41 |
| 7,835,836 | B2 * | 11/2010 | Bolourchi et al. ............... 701/41 |
| 2006/0217860 | A1 | 9/2006 | Ihara |
| 2008/0109134 | A1 * | 5/2008 | Bolourchi et al. ............... 701/41 |
| 2008/0189012 | A1 * | 8/2008 | Kaufmann ....................... 701/41 |
| 2010/0004821 | A1 | 1/2010 | Buerkle et al. |

FOREIGN PATENT DOCUMENTS

| DE | 19943410 A1 | 5/2000 |
| DE | 102005004726 A1 | 8/2006 |
| DE | 102007058078 A1 | 6/2009 |
| DE | 102008007186 A1 | 8/2009 |
| FR | 2861045 A1 | 4/2005 |
| WO | 2005063546 A1 | 7/2005 |

OTHER PUBLICATIONS

European Search Report Dated May 31, 2012, Application No. 11188765.9-1264, Applicant Volvo Car Corporation, 6 Pages.

* cited by examiner

*Primary Examiner* — Mary Cheung
*Assistant Examiner* — Michael Berns
(74) *Attorney, Agent, or Firm* — Brooks Kushman P.C.

(57) ABSTRACT

A method for adaptation of a steering wheel torque overlay of a lane keeping aid system in a vehicle comprises requesting a controller steering wheel torque overlay $T_r$ from a controller, measuring an applied steering wheel torque $T_a$ applied on a steering wheel of the vehicle, determining a scaling factor $\alpha$ as a function of the applied steering wheel torque $T_a$, and determining a corrective steering wheel torque overlay $T_c$ based on the controller torque overlay $T_r$ multiplied by the scaling factor $\alpha$. A system for adaptation of a steering wheel torque overlay, a lane keeping aid system comprising such a system, and a vehicle comprising such a lane keeping aid system are also disclosed.

20 Claims, 4 Drawing Sheets

Legend
18 – Lane Keeping Aid System
20 – System for Adaptation of
  Steering Wheel Torque Overlay
22 – Controller
24 – Means for Measuring Applied
  Steering Wheel Torque $T_a$
26 – Means for Determining Scaling
  Factor $\alpha$
28 – Means for Determining
  Corrective Steering Wheel
  Torque Overlay $T_c$
30 – Means for Determining
  Direction of Intervention

METHOD AND SYSTEM FOR ADAPTATION OF A STEERING WHEEL TORQUE OVERLAY OF A LANE KEEPING AID SYSTEM

CROSS-REFERENCE TO RELATED APPLICATIONS

This application claims foreign priority benefits under 35 U.S.C. §119(a)-(d) to European patent application number EP 11188765.9, filed Nov. 11, 2011, which is incorporated by reference in its entirety.

TECHNICAL FIELD

The present disclosure relates to a method for adaptation of a steering wheel torque overlay of a lane keeping aid system in a vehicle. The disclosure further relates to a system for adaptation of a steering wheel torque overlay and to a lane keeping aid system comprising such a system for adaptation of a steering wheel torque overlay. In addition, the disclosure refers to a vehicle comprising such a system.

BACKGROUND

It is known to use electrical power steering, commonly abbreviated as EPAS, in a vehicle such as a car, lorry, bus or truck, wherein an electric motor assists a driver of the vehicle by adding an assistive torque to e.g., a steering column. It is further known to use a lane keeping aid system in order to help the driver keep in the lane. For lane keeping aid systems where the EPAS is used, a steering wheel torque overlay, i.e., additional steering wheel torque on top of what would have been obtained by the base assist of the EPAS, is used for lateral position control. The present disclosure relates to an adaptation of such a steering wheel torque overlay. However, the principles of the present disclosure are independent of the EPAS and may also be used in a vehicle without EPAS for adapting the steering wheel torque overlay.

Document US 2010/0004821 A1 discloses a device for keeping a vehicle in its lane, including a reference model, which obtains geometric data regarding the position of the vehicle in the lane as well as data relating to the course of the lane from a lane detection system, and from these calculates a set point variable for controlling the vehicle position. In order to allow for corners to be cut, the guiding behaviour of the control system is modified in such a way when cornering that, in the event of a deviation of the path of motion of the vehicle from the set point path of motion in the direction of the inside of the road curve, no or only low steering forces are applied to the steering system. In an embodiment, illustrated in FIG. 3b of US 2010/0004821 A1, a characteristic controller curve is widened asymmetrically while the driver cuts a corner and a dead zone is created, wherein no guide torque is produced in spite of a system deviation. It is further stated that the control characteristic curve may have a P-behaviour and in particular not an I-behaviour.

The system disclosed in US 2010/0004821 A1 discloses a static regulator for the angle deviation, wherein the characteristic curve is influenced by different variables of the vehicle and environment. When cutting a road curve, the reference value of the regulator is displaced while maintaining the general shape of the characteristic curve. Moreover, US 2010/0004821 A1, relates to driving in road curves. Driving straight ahead is not mentioned.

SUMMARY

An object of the present disclosure is to overcome or ameliorate at least one of the disadvantages of the prior art, or to provide a useful alternative.

It is desirable to provide a method for adaptation of a torque overlay of a lane keeping aid system, which works under various conditions where the lane keeping aid system could intervene. This includes situations like driving straight ahead, driving in road curves, entering road curves, exiting road curves and cutting road curves.

It is further desirable to provide a method for adaptation of a torque overlay of a lane keeping aid system, which takes a steering input from the driver into account.

Thus, in a first aspect of the present disclosure there is provided a method for adaptation of a steering wheel torque overlay of a lane keeping aid system in a vehicle, the method comprising:

a) requesting a controller steering wheel torque overlay $T_r$ from a controller,
b) measuring an applied steering wheel torque $T_a$ applied on a steering wheel of the vehicle,
c) determining a scaling factor $\alpha$ as a function of the applied steering wheel torque $T_a$,
d) determining a corrective steering wheel torque overlay $T_c$ based on the controller torque overlay $T_r$ multiplied by the scaling factor $\alpha$.

The method may be used in order to obtain a comfortable steering feel under various conditions where the lane keeping aid system could intervene. This includes situations like driving straight ahead, driving in road curves, entering road curves, exiting road curves and cutting road curves.

The controller of step a) may be the controller used in the lane keeping aid system, i.e., a lane position controller. The controller may be adapted to control the steering angle of the vehicle.

The method takes the steering input from the driver into account by measuring the applied steering wheel torque $T_a$ applied by the driver on a steering wheel of the vehicle. The applied steering wheel torque $T_a$ is used when determining the scaling factor $\alpha$.

The scaling factor $\alpha$ is used to adapt the controller torque overlay $T_r$. The adaptation is performed by multiplying the controller torque overlay $T_r$ with the scaling factor $\alpha$ in order to obtain the corrective steering wheel torque overlay $T_c$; $T_c = \alpha T_r$.

The scaling factor $\alpha$ may, in addition, be tunable dependent on at least one vehicle and/or road parameter. Examples of such parameters are vehicle speed, yaw rate, lateral acceleration and curve radius.

The controller steering wheel torque overlay $T_r$ may be limited by a saturation value, i.e. it may have a maximal value. If no saturation value would be used, the controller torque overlay $T_r$ would increase with increasing control error, potentially ending up in very large values.

In a preferred embodiment, the method described above is combined with the use of the saturation value for the controller steering wheel torque overlay $T_r$.

The scaling factor $\alpha$ may be a function of the applied steering wheel torque $T_a$ expressed as a scaling curve, the scaling curve comprising a dead zone $\Delta$ with no changes of the scaling factor $\alpha$ as a function of the applied steering wheel torque $T_a$ for values around a selectable value $T_A$ of the applied steering wheel torque $T_a$, and wherein the scaling factor $\alpha$ decreases with the absolute value of the applied steering wheel torque $T_a$ for at least part of the scaling curve outside of the dead zone $\Delta$. The selectable value $T_A$ of the applied steering wheel torque $T_a$ is located at the midpoint of the dead zone $\Delta$. The scaling curve may be expressed as an analytical function or as a look-up table. The scaling curve may be symmetric around the selectable value $T_A$ of the applied steering wheel torque $T_a$. The selectable value $T_A$ may be zero, but can also differ from zero. Both these cases will be explained below.

The dead zone $\Delta$ of the scaling curve may be delimited by at least one primary break point at a value $T_p$ of the applied steering wheel torque $T_a$, the value $T_p$ of the primary break point $T_p$ being different from the selectable value $T_A$, wherein the value $T_p$ of the at least one primary break point may be tunable dependent on at least one vehicle and/or road parameter, such as vehicle speed, yaw rate, lateral acceleration or curve radius.

The scaling curve may further comprise at least one secondary break point $T_s$ corresponding to a higher absolute value of the applied steering wheel torque $T_a$ than the value $T_p$ of the at least one primary break point being on the same side of the dead zone, the value $T_s$ of the secondary break point corresponding to a lower value of the scaling factor $\alpha$ than that of the primary break point. The value $T_s$ of the at least one secondary break point may be tunable dependent on at least one vehicle and/or road parameter, such as vehicle speed, yaw rate, lateral acceleration or curve radius. Preferably the scaling curve is continuously decreasing between the primary break point and the secondary break point, most preferably linearly decreasing. The position/s of the primary and/or secondary break point/s may be parameterized. In addition, it may be possible to select the positions of the primary and/or secondary break point/s based on the type of vehicle, vehicle model or even based on which driver is driving the vehicle.

The method may further comprise b2) determining a direction of intervention, the direction of intervention having a state comprising at least one of "inner side", "straight forward" and "outer side", and in step c) using the state when determining the scaling factor $\alpha$ as a function of the applied steering wheel torque $T_a$.

The states for the direction of intervention may be selected according to "Straight forward": curve radius>X m.

"Inner side": curve radius<=X m and (lane keep assist intervention when approaching left lane marker when lane is turning to the left OR lane keep assist intervention when approaching right lane marker when lane is turning to the right). "Outer side": curve radius<=X m and (lane keep assist intervention when approaching left lane marker when lane is turning to the right OR lane keep assist intervention when approaching right lane marker when lane is turning to the left). The value of the curve radius for transfer between the states, X, is selectable. It may for example be between 1000 m and 10000 m, preferably between 1500 m and 5000 m.

The values of the curve radius X for transfer between the states and the at least one other vehicle and/or road parameter used for tuning the scaling factor $\alpha$, such as vehicle speed, yaw rate or lateral acceleration, may be selected based on the type of vehicle and may for example be selected based on the model of the vehicle or even based on who is driving the vehicle.

In case the state of the direction of intervention is determined to be "outer side", the position of the value $T_p$ of the at least one of the primary break point and/or the value $T_s$ of the secondary break point of at least one half of the scaling curve is displaced towards higher absolute values for the applied steering wheel torque $T_a$ as compared to the state "straight forward", the size of the displacement being dependent on at least one vehicle and/or road parameter, such as vehicle speed, yaw rate, lateral acceleration or curve radius.

By a "half of the scaling curve" is meant the half of the scaling curve being either on the left-hand side or the right-hand side of zero applied steering wheel torque $T_a$. The left-hand half thus corresponds to negative values for the applied steering wheel torque $T_a$ and the right-hand side to positive values.

In the mentioned case with the state being "outer side", the half of the scaling curve may be parallel-displaced towards a higher absolute value for the applied steering wheel torque $T_a$ as compared to the state "straight forward", the size of the parallel-displacement being dependent on at least one vehicle and/or road parameter, such as vehicle speed, yaw rate, lateral acceleration or curve radius. Hence, the position of dead zone may be displaced, while maintaining the magnitude of the scaling curve.

In case the state of the direction of intervention is determined to be "inner side", the magnitude of the scaling curve may be reduced dependent on at least one vehicle and/or road parameter, such as vehicle speed, yaw rate, lateral acceleration or curve radius, as compared to the state "straight forward". The positions of the value $T_p$ of the primary break point and/or the value $T_s$ of the secondary break point may be moved independently of each other as a function of the vehicle and/or road parameter/s. Preferably, the magnitude of the whole scaling curve is reduced. Most preferably, the magnitude of both halves of the scaling curve is reduced in the same manner. Hence, the position of dead zone $\Delta$ may be maintained, while reducing the magnitude of the scaling curve.

In an embodiment of the invention, a set of scaling curves is used, the actual scaling curve being selected based on the determined direction of intervention. The direction of intervention may have a state comprising at least one of "inner side", "straight forward" and "outer side".

Preferably, the "straight forward" state uses a scaling curve which is symmetric and centred around zero. By symmetric is meant that the two halves, i.e., the left-hand half and the right-hand half, are mirror-images of each other. For the "straight forward" state the magnitude of the scaling curve may be full. This corresponds to the scaling factor being 1 in the dead zone $\Delta$.

Two or three of these states "inner side", "straight forward" or "outer side" may be used in an embodiment of the method according to the disclosure. Preferably, the transition between different states is arranged to be continuous, such that a stepwise change of the scaling factor $\alpha$ may be avoided when changing state. The transition between "inner side" and "straight forward" may then be made at no reduction of the magnitude. The transition between "outer side" and "straight forward" may then be made at essentially zero displacement.

In a second embodiment of the disclosure there is provided a system for adaptation of a steering wheel torque overlay comprising:

means for measuring an applied steering wheel torque $T_a$ applied on a steering wheel, means for determining a scaling factor $\alpha$ as a function of the applied steering wheel torque $T_a$, means for determining a corrective steering wheel torque overlay $T_c$ based on a controller torque overlay $T_r$ multiplied by the scaling factor $\alpha$.

The controller torque overlay $T_r$ may be an output from a controller of the lane keeping aid system. This controller may be located outside of the system for adaptation of a steering wheel torque but within the lane keeping aid system, see below.

The system may further comprise:

means for determining a direction of intervention, the direction of intervention having a state comprising at least one of "inner side", "straight forward" or "outer side".

The state is used as an input to the means for determining the scaling factor α as a function of the applied steering wheel torque $T_a$.

In a third embodiment of the disclosure there is provided a lane keeping aid system comprising a system for adaptation of a steering wheel torque overlay according to above and a controller adapted to output a controller torque overlay $T_r$, wherein the controller torque overlay $T_r$ is used as input to the system for adaptation of a steering wheel torque overlay.

The controller may be a lane position controller, i.e., the controller of the lane keeping aid system. The controller may be adapted to control the steering angle of the vehicle. The controller may comprise at least one PID controller, i.e., a proportional-integral-derivative controller.

In a fourth embodiment of the disclosure, there is provided a vehicle comprising a lane keeping aid system and a system for adaptation of a steering wheel torque overlay according to above. The system for adaptation of the steering wheel torque overlay may form part of the lane keeping aid system, as described above, but may also be a separate system.

The vehicle may further comprise an additional sensor for sensing at least one vehicle and/or road parameter, such as vehicle speed, yaw rate, lateral acceleration or curve radius. The output of the additional sensor is used as input to the means for determining the scaling factor α as a function of the applied steering wheel torque $T_a$.

BRIEF DESCRIPTION OF THE DRAWINGS

Embodiments of the present disclosure will hereinafter be described in greater detail by means of non-limiting examples and with reference to the appended drawings wherein.

DETAILED DESCRIPTION

Example embodiments are set forth in the following description. It should be realized, however, that the embodiments are included in order to explain principles of the disclosure and not to limit the scope of the disclosure defined by the appended claims. Furthermore, details from two or more of the embodiments may be combined with each other.

Figure 1:
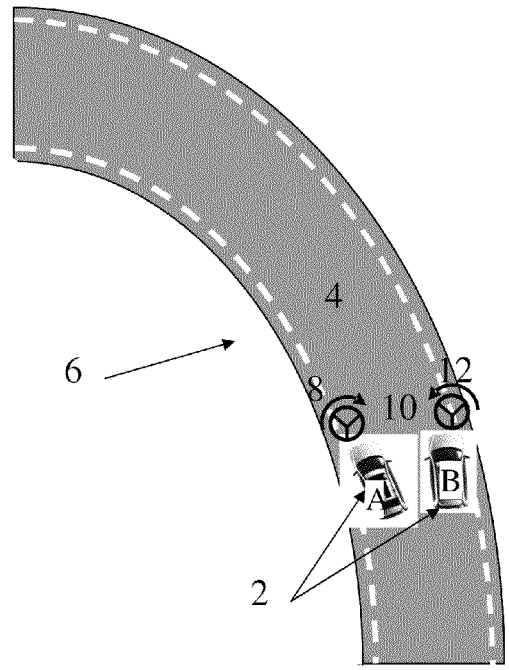
FIG. 1 illustrates schematically lane keeping aid interventions in a road curve.

FIG. 1 schematically illustrates the principles of lane keeping aid interventions in a road curve 6. A vehicle 2 is driven by a driver in a lane 4 and comprises a lane keeping aid system. The lane keeping aid system may assist the driver to keep the vehicle 2 in the centre of the lane 4. When being on an inner side of the lane 4 in the road curve 6, as in position A of FIG. 1, the lane keeping aid system will assist to steer the vehicle 2 towards the centre of the lane 4, i.e., against the lane curvature, in FIG. 1 illustrated by applying a torque, see arrow 8, to the steering wheel 10. This additional torque applied by the lane keeping aid system is called steering wheel overlay torque. When being on an outer side of the lane 4 in the road curve 6, as position B of FIG. 1, the lane keeping aid system will assist to steer the vehicle 2 towards the centre of the lane 4, i.e., along the lane curvature, in FIG. 1 illustrated by applying a torque, see arrow 12 to the steering wheel 10. The general principles of such a lane keeping aid system are known by the skilled person and will not be explained in any further detail, except for the details differentiating the invention from the state of the art.

During lane keeping aid intervention and while entering or driving in a road curve, the steering wheel torque overlay from the lane keeping aid system will be experienced differently dependent of whether the intervention occurs on the inner side of the lane 4 in the road curve 6, see position A in FIG. 1, or if it occurs on the outer side of the lane 4 in the road curve 6, see position B in FIG. 1. If the intervention occurs on the inner side of the lane 4 in the road curve 6, it can be experienced as disturbing by the driver, if the magnitude of the steering wheel torque overlay from the lane keeping aid system is the same as what it would have been if the intervention would have occurred on the outer side of the lane in the road curve 6. However, completely suppressing an intervention, i.e., not activating the intervention at all or aborting the intervention completely, in such situations can be problematic when the curve radius changes continuously, and may result in reduced performance of the lane keeping aid system and lower real life safety benefit.

The present disclosure relates to a method and a system for adaptation of the steering wheel torque overlay of the lane keeping aid system in a vehicle. The adaptation is performed by taking a steering wheel torque applied by the driver on the steering wheel into account. The adaptation may be performed in a situation when the driver of the vehicle wants to overrule the intervention of the lane keeping aid system. The driver may for example deliberately choose to be close to the lane marker in order to avoid an obstacle in the lane or to avoid water on the road. Further, the driver may want to change lane and therefore approaches the lane marker.

Figure 2:
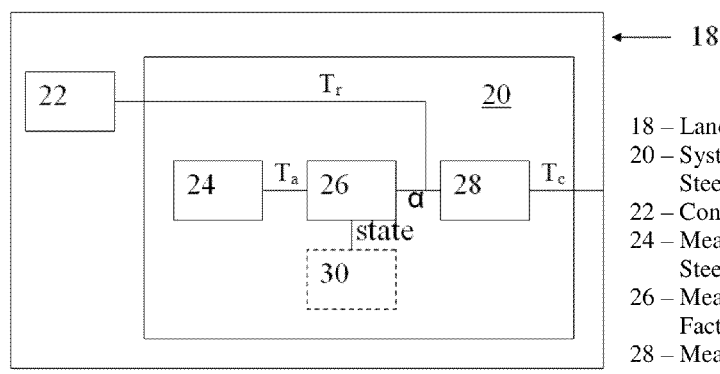
FIG. 2 illustrates schematically a system for adaptation of a steering wheel torque overlay according to the disclosure.

FIG. 2 schematically illustrates a lane keeping aid system 18 comprising a system 20 for adaptation of the steering wheel torque overlay in a vehicle and a controller 22. The controller 22 is the controller used in the lane keeping aid system 20, i.e., a lane position controller. The controller 22 may be adapted to control the steering angle of the vehicle. The controller 22 is adapted to provide a controller torque overlay $T_r$ to be used as input for the system 20 for adaptation of the steering wheel torque overlay.

The system 20 for adaptation of the steering wheel torque overlay comprises means 24 for measuring an applied steering wheel torque $T_a$ applied on a steering wheel, means 26 for determining a scaling factor α as a function of the applied steering wheel torque $T_a$, and means 28 for determining a corrective steering wheel torque overlay $T_c$ based on the controller torque overlay $T_r$ multiplied by the scaling factor α.

Optionally, the system for adaptation may further comprise means 30 for determining a direction of intervention.

The direction of intervention has a state comprising at least one of "inner side", "straight forward" and "outer side", which states are further explained below. The state may be used as input to the means 26 for determining the scaling factor α as a function of the applied steering wheel torque $T_a$.

Figure 3:
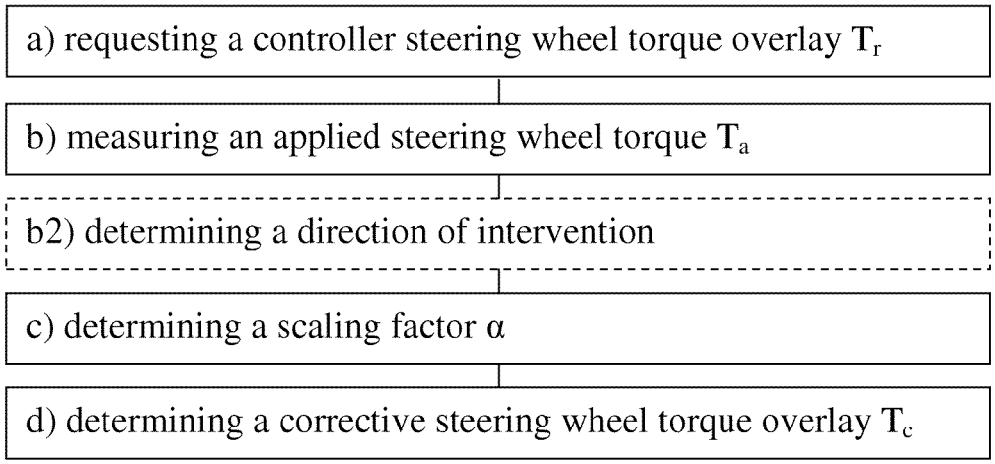
FIG. 3 illustrates a method for adaptation of a steering wheel torque overlay according to the disclosure.

The method, as illustrated in FIG. 3, comprises a) requesting a controller steering wheel torque overlay $T_r$ from a controller, b) measuring an applied steering wheel torque $T_a$ applied on a steering wheel of the vehicle, c) determining a scaling factor α as a function of the applied steering wheel torque $T_a$, d) determining a corrective steering wheel torque overlay $T_c$ based on the controller torque overlay $T_r$ multiplied by the scaling factor α.

Steps a) and b) are performed in parallel or after each other.

This is expressed as $T_c = \alpha T_r$, wherein the scaling factor α is a function of an applied steering wheel torque $T_a$ applied on a steering wheel of the vehicle.

Optionally, the method may further comprise: b2) determining a direction of intervention, the direction of intervention having a state comprising at least one of "inner side", "straight forward" or "outer side", and in step c) using the state when determining the scaling factor α as a function of the applied steering wheel torque $T_a$.

Steps a), b) and b2) may be performed in parallel, two of them in parallel or after each other.

Figure 4:
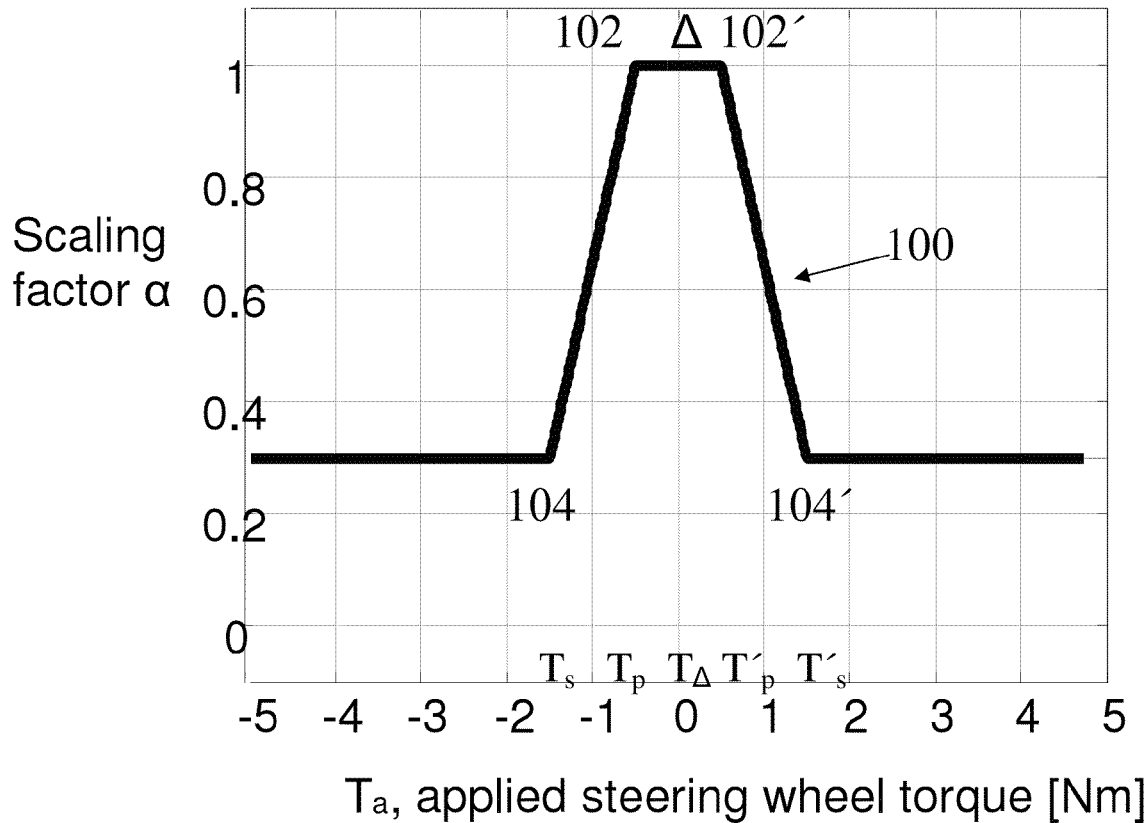
FIG. 4 is a diagram of a scaling factor as a function of applied steering wheel torque for a first embodiment of the disclosure.

FIG. 4 illustrates a scaling curve 100 showing the scaling factor α as a function of the applied steering wheel torque $T_a$. As can be seen, the scaling curve 100 comprises a dead zone Δ centred around a selectable value $T_A$ of the applied steering wheel torque $T_a$. In this case $T_A$ is zero, with zero corresponding to no applied torque, e.g. the driver not gripping the steering wheel. The selectable value $T_A$ of the applied steering wheel torque $T_a$ is defined as the midpoint of the dead zone Δ. Scaling factor 1, as in the dead zone Δ, means that the controller steering wheel torque overlay $T_r$ is used as the corrective steering wheel torque overlay $T_c$. Outside the dead zone Δ the scaling factor α is less than 1, it thus scales down the controller steering wheel torque overlay $T_r$; such that $T_c = \alpha T_r$.

The scaling curve 100 comprises at least one primary break point 102, 102' corresponding to a value $T_p$, $T_{p'}$ of the applied steering wheel torque $T_a$. In the illustrated embodiment the scaling curve 100 is symmetric around 0 and there are two primary break points 102, 102'. The primary break points 102, 102' delimit the dead zone Δ. The scaling curve 100 further comprises at least one secondary break point 104, 104' corresponding to a value $T_s$, $T_{s'}$ of the applied steering wheel torque $T_a$. The absolute value of $T_s$, $T_{s'}$ is greater than that of $T_p$, $T_{p'}$ for the same half of the scaling curve 100. In the illustrated embodiment the scaling curve 100 is symmetric around 0 and there are two secondary break points 104, 104'. The scaling curve 100 is arranged such that the scaling factor α decreases between the primary break point 102, 102' and the secondary break point 104, 104' at either side of the centre. Even if FIG. 1 shows a linear decrease, the scaling curve is not restricted to a particular shape.

The scaling curve 100 may have a variety of shapes, but is preferably symmetric. The scaling curve could be expressed as an analytical function or as a look-up table. The position/s of the primary and/or secondary break point/s may be parameterized as a function of at least one vehicle and/or road parameter, such as vehicle speed, yaw rate, lateral acceleration or curve radius.

If only one scaling curve is used, as the scaling curve 100 disclosed in FIG. 4, curve driving will not be handled in any specific way. The steering wheel torque overlay will then be scaled down in the same way regardless whether the intervention occurs on a straight road, the inner side of a lane or the outer side of a lane.

Therefore, in an embodiment of the invention, a set of scaling curves is used, the actual scaling curve being selected based on a direction of intervention. The direction of intervention may have a state comprising at least one of "inner side", "straight forward" and "outer side".

Preferably, the "straight forward" state uses a scaling curve which is symmetric and centred around zero, for example as the one illustrated in FIG. 4.

Figure 5:
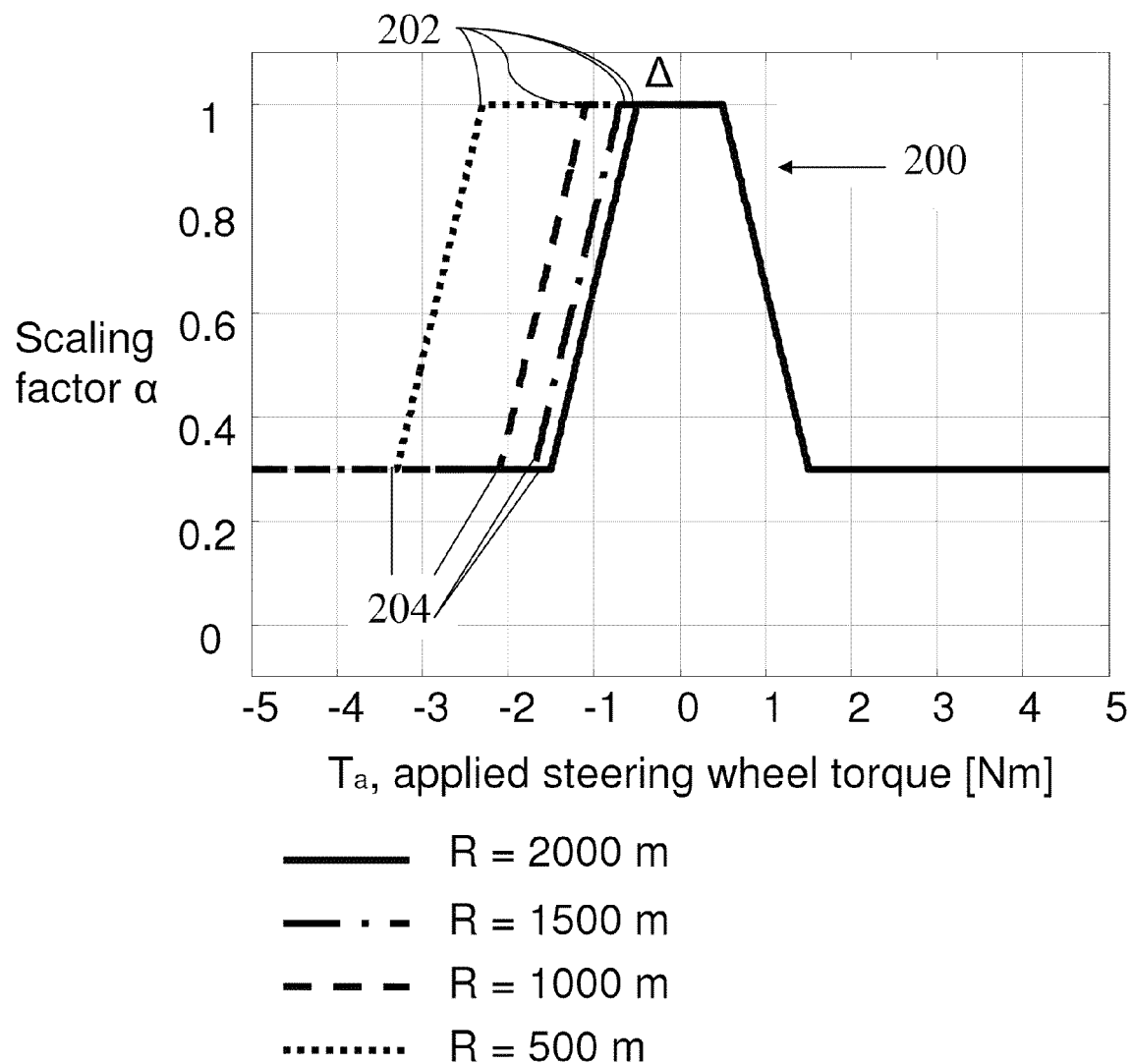
FIG. 5 is a diagram of a scaling factor as a function of applied steering wheel torque which may be used for a vehicle driving in an outer side of the lane.

When the direction of intervention has the state of "outer side", the scaling curve may look like in FIG. 5. FIG. 5 illustrates a set of scaling curves 200 used for "outer side" and corresponding to different values of curve radius R expressed in meters. As can be gleaned from the figure, road curves having a radius above 2000 meters are treated as the state "straight forward", i.e., the scaling curve of 2000 m coincides with that of FIG. 4. When the road curve gets sharper, i.e., the curve radius decreases, the scaling curve is displaced against higher absolute values of the applied steering wheel torque $T_a$, i.e., to the left in FIG. 5. The magnitude is maintained, when the scaling curve is displaced to the left in the figure. The centre $T_A$ of the dead zone Δ then also moves to the left. This corresponds to applying a certain torque to the steering wheel in order to follow the curvature. The sharper the road curve is for a specific vehicle speed, the higher is the absolute value of the steering wheel torque used for following the curvature.

In FIG. 5 it is illustrated to select a certain scaling curve dependent on curve radius. As an alternative, or in combination, at least one other vehicle and road parameter may be used, such as vehicle speed, yaw rate or lateral acceleration.

In FIG. 5 only half of the scaling curve is changed, in the illustrated case the left-hand half. However, whether it is the left-hand or right-hand half being changed, depends on the principle used for determining the sign for the road curvature. In general terms, which half of the scaling curve being changed corresponds to the direction in which the road curve bends i.e., the steering wheel torque needed to follow the road curve.

Figure 6:
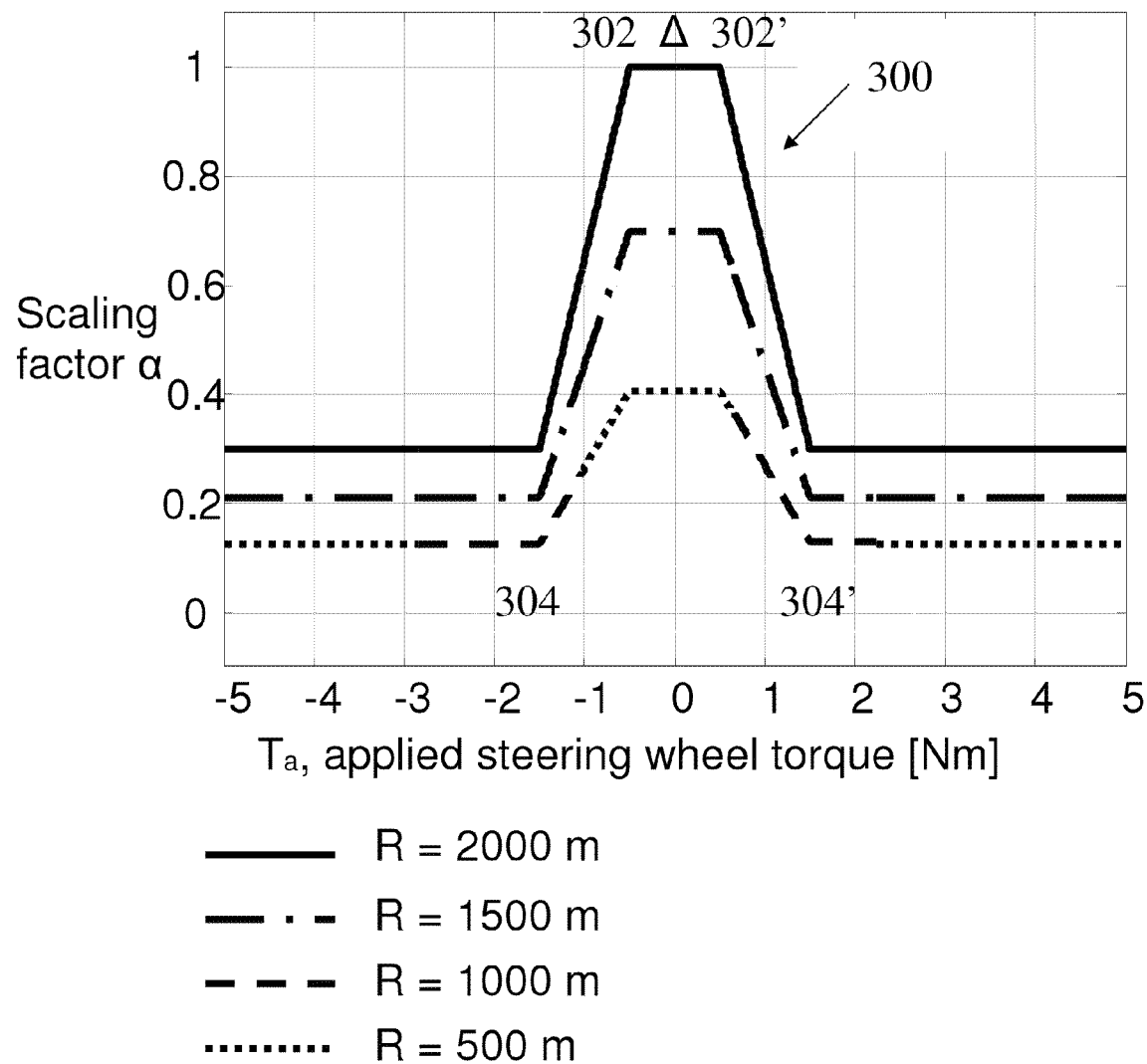
FIG. 6 is a diagram of a scaling factor as a function of applied steering wheel torque which may be used for a vehicle driving in an inner side of the lane.

If instead the direction of intervention has the state of "inner side", the scaling curve may look like in FIG. 6. FIG. 6 illustrates a set of scaling curves use for "inner side" and corresponding to different curve radii R expressed in meters. As can be gleaned from the figure, road curves having a radius above 2000 meters are treated as the state "straight forward", i.e., the scaling curve of 2000 m coincides with that of FIG. 4. When the road curve gets sharper, i.e., the curve radius decreases, the magnitude of the scaling curve is reduced, however the position around zero applied steering wheel torque $T_a$ is maintained. The centre $T_A$ of the dead zone Δ therefore is the same. The sharper the road curve is, the lower is the magnitude of the scaling curve. FIG. 6 further illustrates that the scaling curves for radii 1000 meters and 500 meters coincide.

As for FIG. 5, FIG. 6 illustrates selecting a certain scaling curve dependent on curve radius. As an alternative, or in combination, at least one other vehicle and/or road parameter may be used for selecting the scaling curve, such as vehicle speed, yaw rate or lateral acceleration.

In the example, the states for the direction of intervention are selected according to "Straight forward": curve radius>X m.

"Inner side": curve radius<=X m and (lane keep assist intervention when approaching left lane marker when lane is turning to the left OR lane keep assist intervention when approaching right lane marker when lane is turning to the right).

"Outer side": curve radius<=X m and (lane keep assist intervention when approaching left lane marker when lane is turning to the right OR lane keep assist intervention when approaching right lane marker when lane is turning to the left).

In FIGS. 5-6, the curve radius for transfer between the states, X, is illustrated as being 2000 meters. However, the value of X for transfer between the states is selectable. It may for example be between 1000 m and 10000 m, preferably between 1500 m and 5000 m.

The values of the curve radius for transfer between the states, X, and the at least one other vehicle and/or road parameter, such as vehicle speed, yaw rate or lateral acceleration, may be selected based on the type of vehicle and for example be selected based on the model of the vehicle, or who is driving the vehicle.

The controller steering wheel torque overlay $T_r$ may be limited by a saturation value. Hence the corrective steering wheel torque overlay $T_c$ will also have a maximal value. If no saturation value would be used, $T_r$ would increase with increasing control error, potentially ending up in very large values.

Furthermore, in accordance with the embodiments described herein, the means (e.g., means 24, 26, 28, 30, etc.) for performing the various functions described above may each comprise or further comprise one or more of the following: computer software, hardware or both, such as an Application Specific Integrated Circuit (ASIC), one or more appropriately programmed microprocessors, one or more controllers or control modules, and/or one or more suitable sensors.

Further modifications of the invention within the scope of the appended claims are feasible. As such, the present invention should not be considered as limited by the embodiments and figures described herein. Rather, the full scope of the invention should be determined by the appended claims, with reference to the description and drawings. Additionally, the features of various implementing embodiments may be combined to form further embodiments of the invention.

What is claimed is:

1. A method for adaptation of a steering wheel torque overlay of a lane keeping aid system in a vehicle, the method comprising:
   a) requesting a controller steering wheel torque overlay $T_r$ from a controller;
   b) measuring an applied steering wheel torque $T_a$ applied on a steering wheel of the vehicle;
   c) determining a scaling factor $\alpha$ as a function of the applied steering wheel torque $T_a$; and
   d) determining a corrective steering wheel torque overlay $T_c$ based on the controller torque overlay $T_r$ multiplied by the scaling factor $\alpha$.

2. The method according to claim 1 wherein the scaling factor $\alpha$ is tuneable dependent on at least one vehicle and/or road parameter.

3. The method according to claim 2 wherein the at least one vehicle and/or road parameter comprise/comprises vehicle speed, yaw rate, lateral acceleration and/or curve radius.

4. The method according to claim 1 wherein the controller steering wheel torque overlay $T_r$ is limited by a saturation value.

5. The method according to claim 1 wherein the scaling factor $\alpha$ is a function of the applied steering wheel torque $T_a$ expressed as a scaling curve, the scaling curve comprising a dead zone ($\Delta$) with no changes of the scaling factor $\alpha$ as a function of the applied steering wheel torque $T_a$ for values around a selectable value $T_A$ of the applied steering wheel torque $T_a$, and wherein the scaling factor $\alpha$ decreases with the absolute value of the applied steering wheel torque Ta for at least part of the scaling curve outside of the dead zone ($\Delta$).

6. The method according to claim 5 wherein the dead zone ($\Delta$) of the scaling curve is delimited by a primary break point at a value $T_p$ of the applied steering wheel torque $T_a$, the value $T_p$ of the primary break point being different from the selectable value $T_A$, and wherein the value $T_p$ of the primary break point is tuneable dependent on at least one vehicle and/or road parameter.

7. The method according to claim 6 wherein the at least one vehicle and/or road parameter comprise/comprises vehicle speed, yaw rate, lateral acceleration and/or curve radius.

8. The method according to claim 6 wherein the scaling curve further comprises a secondary break point corresponding to a higher absolute value $T_s$ of the applied steering wheel torque Ta than the value $T_p$ of the primary break point being on the same side of the dead zone ($\Delta$), the value $T_s$ of the secondary break point corresponding to a lower value of the scaling factor $\alpha$ than that of the primary break point.

9. The method according to claim 8 wherein the scaling curve continuously decreases between the primary break point and the secondary break point.

10. The method according to claim 8 further comprising determining a direction of intervention, the direction of intervention having a state comprising at least one of "inner side", "straight forward" and "outer side", and in step c) using the state when determining the scaling factor $\alpha$ as a function of the applied steering wheel torque $T_a$, wherein in case the state of the direction of intervention is determined to be "outer side", position of at least one of the value $T_p$ of the primary break point and/or the value $T_s$ of the secondary break point of at least one half of the scaling curve is displaced towards higher absolute values for the applied steering wheel torque $T_a$ as compared to the state "straight forward", the size of the displacement being dependent on at least one vehicle and/or road parameter.

11. The method according to claim 10 wherein the at least one half of the scaling curve is parallel-displaced towards a higher absolute value for the applied steering wheel torque $T_a$ as compared to the state "straight forward", the size of the parallel-displacement being dependent on at least one vehicle and/or road parameter.

12. The method according to claim 10 wherein in case the state of the direction of intervention is determined to be "inner side", magnitude of the scaling curve is reduced dependent on at least one vehicle and/or road parameter.

13. The method according to claim 1 further comprising determining a direction of intervention, the direction of intervention having a state comprising at least one of "inner side", "straight forward" and "outer side", and in step c) using the state when determining the scaling factor $\alpha$ as a function of the applied steering wheel torque $T_a$.

14. The method according to claim 13 wherein the direction of intervention comprises at least two of the states "inner side", "straight forward" or "outer side."

15. A system for adaptation of a steering wheel torque overlay, the system comprising:
   means for measuring an applied steering wheel torque $T_a$ applied on a steering wheel;
   means for determining a scaling factor $\alpha$ as a function of the applied steering wheel torque $T_a$; and means for determining a corrective steering wheel torque overlay $T_c$ based on a controller torque overlay $T_r$ multiplied by the scaling factor $\alpha$.

16. The system according to claim 15 further comprising:

means for determining a direction of intervention, the direction of intervention having a state comprising at least one of "inner side", "straight forward" or "outer side"; and wherein the state is useable as an input to the means for determining the scaling factor $\alpha$ as a function of the applied steering wheel torque $T_a$.

17. A lane keeping aid system comprising:

a controller adapted to output a controller torque overlay $T_r$; and a subsystem for adaptation of a steering wheel torque overlay, the subsystem including means for measuring an applied steering wheel torque $T_a$ applied on a steering wheel, means for determining a scaling factor $\alpha$ as a function of the applied steering wheel torque $T_a$, and means for determining a corrective steering wheel torque overlay $T_c$ based on the controller torque overlay $T_r$ multiplied by the scaling factor $\alpha$.

18. A vehicle comprising the lane keeping aid system according to claim 17.

19. The lane keeping system of claim 17 wherein the means for determining the scaling factor $\alpha$ is configured to determine the scaling factor $\alpha$ as a function of the applied steering wheel torque $T_a$ expressed as a scaling curve, the scaling curve comprising a dead zone ($\Delta$) with no changes of the scaling factor $\alpha$ as a function of the applied steering wheel torque $T_a$ for values around a selectable value $T_A$ of the applied steering wheel torque $T_a$, wherein the scaling factor $\alpha$ decreases with the absolute value of the applied steering wheel torque Ta for at least part of the scaling curve outside of the dead zone ($\Delta$), wherein the dead zone ($\Delta$) of the scaling curve is delimited by a primary break point at a value $T_p$ of the applied steering wheel torque $T_a$, the value $T_p$ of the primary break point being different from the selectable value $T_A$, and wherein the value $T_p$ of the primary break point is tuneable dependent on at least one vehicle and/or road parameter.

20. The lane keeping system of claim 17 further comprising means for determining a direction of intervention, the direction of intervention having a state comprising at least one of "inner side", "straight forward" or "outer side"; and wherein the means for determining the scaling factor $\alpha$ is configured to receive the state as an input.

\* \* \* \* \*

UNITED STATES PATENT AND TRADEMARK OFFICE
CERTIFICATE OF CORRECTION

PATENT NO. : 8,849,516 B2  
APPLICATION NO. : 13/671946  
DATED : September 30, 2014  
INVENTOR(S) : Lazic et al.

Page 1 of 1

It is certified that error appears in the above-identified patent and that said Letters Patent is hereby corrected as shown below:

In the Claims

Column 10, Line 5, Claim 5:

After "applied steering wheel torque"  
Delete "Ta" and  
Insert -- $T_a$ --.

Signed and Sealed this  
Seventeenth Day of February, 2015

Michelle K. Lee  
*Deputy Director of the United States Patent and Trademark Office*